United States Patent [19]

Wilson

[11] 4,376,176
[45] Mar. 8, 1983

[54] PROCESS FOR SETTING A LATEX OF A FILM FORMING MATERIAL

[75] Inventor: Douglas Wilson, Weybridge, England

[73] Assignee: The British Petroleum Company Limited, London, England

[21] Appl. No.: 237,136

[22] PCT Filed: Jun. 16, 1980

[86] PCT No.: PCT/GB80/00104
§ 371 Date: Feb. 5, 1981
§ 102(e) Date: Feb. 5, 1981

[87] PCT Pub. No.: WO80/02843
PCT Pub. Date: Dec. 24, 1980

[30] Foreign Application Priority Data
Jun. 21, 1979 [GB] United Kingdom ............... 7921722

[51] Int. Cl.$^3$ ...................... C08L 95/00; C08L 11/02
[52] U.S. Cl. ........................................ 524/7; 106/111; 106/116; 524/2; 524/8; 524/60
[58] Field of Search ...................... 260/29.7 S, 28.5 B; 106/109, 116, 111

[56] References Cited

U.S. PATENT DOCUMENTS
3,951,900  4/1976  Bath ............................... 260/29.7 S FOREIGN PATENT DOCUMENTS
1317603  5/1973  United Kingdom .

Primary Examiner—Theodore E. Pertilla
Attorney, Agent, or Firm—Brooks, Haidt, Haffner & Delahunty

[57] ABSTRACT

Delayed action setting of a composition comprising an anionic latex of a film forming polymer by addition of a delayed action setting agent characterized in that the setting agent is a compound containing a multivalent metal cation having defined solubility characteristics in a quantity not greater than 2.5% wt/wt on total composition and not greater than 11% wt/wt based on film forming polymer solids in the composition.

14 Claims, No Drawings

PROCESS FOR SETTING A LATEX OF A FILM FORMING MATERIAL

The present invention relates to the setting of anionic latices of film forming polymers.

It is sometimes desirable to add substances to latices of film forming polymers, which substances will cause the latex to gel or coagulate to a solid or semi-solid after a certain time has passed, so enabling the latex to be subjected to various processing steps before gelling or coagulation takes place. An example of this is in the production of foam rubber in which air is beaten into a rubber latex, to which a substance has previously been added which will remain inactive for a time while air is incorporated into the latex to produce a foam but which will then cause the latex to gel so as to prevent the foam collapsing. The resulting solid foam can then be heated to vulcanise the rubber. The substance which is conventionally used to obtain this delayed action setting effect in rubber latices is sodium silico-fluoride. The same material is used when gelling is required in latices based on rubbers with other materials which are used in producing ground coverings e.g. for sports tracks and playgrounds. Sodium silico-fluoride however is expensive and it can be difficult to incorporate it into latex compositions economically.

British Patent Specification GB 1 317 603 discloses a process for making a hardenable mixture containing an aqueous dispersion of a natural or synthetic rubber. The specification explains that when the previously known hardenable compositions based on such dispersions are used to make thick sections or coatings such thick sections or coatings harden very slowly. The first stage of hardening is the formation of a skin on the surface exposed to the air through which water can escape only very slowly (e.g. over 1 to 2 weeks).

GB 1 317 603 proposes to overcome this problem by adding a solid particulate coagulant which is capable of taking up water e.g. cement, plaster of Paris. The problem of water elimination is overcome by taking up the water within the composition so that it does not need to escape from the composition. However in order to prevent such a rapid coagulation that the composition cannot be worked satisfactorily e.g. to form a smooth layer on a surface, it is necessary to coat the particles of the solid particulate material with a hydrophobic liquid. This increases the costs and makes the process for manufacturing the compositions more complicated. Furthermore as the water present in the composition has to be taken up by the coagulant it is necessary to use large quantities of coagulant. Thus the smallest quantity of coagulant mentioned in GB 1 317 603 is 15 parts of Portland cement per 100 parts of solids in the dispersion, and this is stated to give a soft product. The typical quantity is said to be 25–100 parts of Portland cement per 100 parts of solids in the dispersion.

We have now found a process for the delayed action setting of latices which does not require the water to be taken up by the coagulant. We have surprisingly found that it is possible to carry out delayed action setting of aqueous latices without the water being trapped within the coagulating material.

Thus it is possible to eliminate a major part of the water within two days of applying a layer of the composition and in the case for example of a playground surfacing material it can be possible to walk on the surface relatively shortly after the surface has been applied.

According to the present invention there is provided a process for the delayed action setting of a composition comprising an anionic latex of a film forming polymer by the addition of a delayed action setting agent characterised in that the setting agent is a compound containing a multivalent metal cation, which metal cation compound has a solubility in the range 0.1 g to 150 g per 100 g of water at 20° C. in water and which has a dissolution time greater than 1 minute, the quantity of metal cation compound being not more than 2.5% by weight based on the total weight of composition and not more than 11% based on the weight of film forming polymer solids in the composition.

By "setting" through the specification is meant, not the final hardening or curing reaction which may finally take place, but the initial transformation of the latex to a solid material.

The latices to which the present invention may be applied are latices of film forming polymers i.e. polymers which when a layer of the latex is deposited on a surface form a coherent film when water is evaporated at ambient temperatures. Examples of latices which may be used are latices of natural and synthetic rubbers. Specific examples of synthetic rubbers which may be used are polychloroprene nitrile rubber and styrene butadiene rubber.

The film-forming polymer may also for example be a vinyl chloride polymer. Mixtures of film forming polymers may be present in the latex. In addition the composition to be set may contain other film forming materials. Thus it may contain an emulsion of bitumen which is not normally regarded as a true polymer. The process of the present invention is particularly useful for mixtures of polychloroprene latex and bitumen emulsion which may be used for example in the preparation of ground coverings.

The concentration of film forming polymer in the latex used to prepare the composition of the present invention may vary over a moderately wide range for example from 20% to 70% by weight of the latex but is preferably 45 to 64% based on total weight of latex. The same ranges apply also to emulsions of other film-forming materials e.g. bitumen which may be incorporated in the composition.

Where a film forming material other than the film forming polymer e.g. bitumen, is present in the composition the weight ratio of the additional film forming material (e.g. bitumen) to film forming polymer is preferably in the range 8:1 to 1:8, more preferably 2:1 to 1:2.

The process of the invention is applied to an anionic latex. The nature of the anionic surfactant used in the preparation of the latex is not believed to be critical and may for example be an alkali metal or ammonium salt of an alkyl sulphuric acid, an alkaryl sulphonate or of a long chain fatty acid, or a soap derived from a resin acid. Specific examples of anionic surfactants which may be used in the preparation of the latex are sodium dodecyl sulphate, sodium laurate.

The composition contains a inert non-hydraulic particulate filler. The filler is non-hydraulic as otherwise the filler would take up water from the composition and cause premature setting. It is inert in that it does not release multivalent metal ions into the composition i.e. it will not itself cause the composition to set. The filler may be a hard filler (e.g. sand, slate dust, or certain types of clay e.g. Devolite clays ex-English Chine Clays Ltd) or a deformable filler e.g. tire crumb obtained by milling used rubber tires.

The hard filler may for example have a mesh size in the range 200–50 British Standard mesh. The deformable filler may for example have a particle size in the range 60–10 British standard mesh.

Mixture of different types of filler may be used. It is preferred to use a ratio of deformable filler e.g. tire crumb, and hard filler e.g. sand in the range 10:1 to 1:10 more preferably 3:2 to 2:3.

The total filler content is in the range 15% to 85% of the total composition. The composition preferably does not contain more than 75%, more preferably not more than 60% by weight of the filler. Very high filler levels give a product which tends to crumble. The composition preferably does not contain less than 25% more preferably not less than 30% by weight of filler. Very low levels of filler give a product which is expensive and is less suitable as a playground surfacing material because of excessive resilience.

The metal cation compound must be a compound with a low solubility in water, i.e. it has a solubility of 0.1 g to 150 g per 100 g of water at 20° C., preferably 0.1 g to 50 g per 100 g of water, more preferably 0.2 g to 20 g per 100 g of water.

The metal cation compound must not have a high dissolution rate. The dissolution time is not less than 1 minute and is determined by measuring the time taken for 1 g of the compound (of particle size 150–300 microns) to dissolve in 100 g of $H_2O$ at 20° C. without stirring. The dissolution time is preferably over 2 minutes and most preferably over 5 minutes. If the solubility of the compound is less than 1 g per 100 g of water at 20° C., the dissolution time will of course be infinite.

An extensive list of suitable metal compounds is given in the examples. In addition to these, other suitable compounds are cadmium sulphate, cobalt acetate, zinc sulphate, ferrous sulphate, cupric acetate, and barium nitrate.

Among calcium compounds which can be used are calcium sulphate, calcium sulphate dihydrate (gypsum) and calcium hydroxide. It is preferred however to use calcium sulphate hemihydrate (plaster of Paris).

It is preferred to use an inorganic compound containing a metal cation, and in particular it may be preferred to use an inorganic salt as opposed to a hydroxide.

For any given metal compound a variation in setting time can be achieved by varying the particle size of the particulate solid compound. It is preferred to use a particulate solid metal cation compound with a particle size in the range 25 to 1000 microns (400–10 mesh British Standard Sieve), preferably 75 to 800 microns (200–20 mesh) most preferably 150 to 300 microns (100–50 mesh).

The quantity of metal cation compound required to give a given setting time will depend on the amount of non-hydraulic filler present in the composition. The greater the amount of non-hydraulic filler in the composition the smaller will be the relative proportion of film-forming polymer. To avoid excessively short setting times the composition must not only not contain more than 2.5% by weight of the metal cation compound based on the total weight of composition but must not contain more than 11% by weight of metal cation compound based on the weight of film forming polymer.

Preferably the quantity of metal cation compound is in the range 0.5 to 2% by weight based on the total weight of composition.

The quantity of metal cation compound present in the composition is preferably not more than 6% by weight based on the film forming polymer, more preferably not more than 3% by weight of the film forming polymer. The quantity of delayed action setting agent is preferably such as to give a setting time not less than 5 minutes preferably not less than 10 minutes.

In the production of ground coverings from such mixtures it is particularly desirable for the mixture applied to the ground to be of a sufficiently thick consistency that it can be trowelled or otherwise spread into a uniform layer, but sufficiently liquid that such a spreading operation does not require excessive effort. The mixture must remain easily workable or a convenient period of time but must then set rapidly to give a solid surface which can be walked on and which is resistant to attempts to damage it. The setting agents of the present invention in particular calcium sulphate hemihydrate of the present invention enables compositions of a suitable consistency to be prepared without the use of a thickening agent such as methyl cellulose, although the presence of methyl cellulose is not excluded. Calcium sulphate hemihydrate (i.e. plaster of Paris) is much cheaper than the silico-fluoride gelling agents of the prior art and it is easy to incorporate it into the mixture.

The ground covering compositions may be prepared by mixing together the latex of film forming polymer and bitumen emulsion and then adding the setting agent with the solid fillers which are then mixed into the latex in any convenient mixing apparatus. This is a marked advantage over the silico-fluoride gelling agent as it is not economic to add this with the fillers as its efficiency appears to be adversely affected. It is therefore necessary to make a separate addition of the silico-fluoride gelling agent.

After setting the composition continues to harden by the ready loss of water. Twenty four hours after setting (at a temperature of 20° C.) approximately 45% of the available water has been lost. The rate of loss of water is not greatly influenced by the type or amount of salt as defined above.

After 24 hours a ground covering made according to the above composition is ready for use. The material is tough, energy absorbant, weather and skid resistant.

The invention will now be illustrated by reference to the following examples.

EXAMPLES 1 TO 12

All the Examples were carried out in the same way, differing only in the quantities and nature of the ingredients used. The results using calcium sulphate hemihydrate (POP) are shown in Table 1. Experiments identified by letters instead of numerals are comparative tests not according to the invention.

To a stirred mixture of the latex and latices and a dispersion of zinc oxide is added calcium sulphate hemihydrate (plaster of Paris) (POP) either alone or as a blend with inert fillers, e.g. sand and/or tyre crumb.

After mixing the mix is poured into a mould and allowed to set. The mix is inspected every 2 minutes and the setting time is taken as that time at which point the mix changes from its original state, i.e. that of a thickish highly deformable free flowing substance to that of a non free flowing semi solid material.

Calcium sulphate hemihydrate has a solubility of 0.3 g per 100 g of water at 20° C.

COMMENTS ON THE EXPERIMENTAL RESULTS

Addition of POP to polychloroprene latex will cause the latex to set. The setting time is dependent on the amount of POP added. The more POP added the quicker the setting time.

The presence of sand will accelerate the setting process. Sand alone will not cause the latex to set (Test A). A range of setting times can be achieved by varying the amount of POP at a constant sand level.

Similar results are obtained when tyre crumb is used instead of sand. Examples 5 to 7 show a decrease in setting time as the amount of POP increases. The latex will not set with tyre crumb alone (Test 5).

Mixtures of sand and tyre crumb behave similarly. In Example 8 a blend of 0.5 g POP, 25 g sand and 25 g tyre crumb is added to 100 g of PCP latex. Setting of the latex occurs within 115 minutes. If the amount of POP is increased to 1.0 g the setting time decreases to 14 minutes (Example 9).

Compositions for use as ground coverings, i.e. for school playgrounds, sports surfaces and running tracks are preferably made according to the formulations outlined in Examples 10, 11 and 12. In Example 10 a blend of 0.5 g of POP, 32 g of sand and 20 g tyre crumb are added to a mixture of 30 g polychloroprene latex 15 g bitumen emulsion and 2 g zinc oxide dispersion. The mixture sets in 180 minutes. The setting time can be reduced by increasing the amount of POP present. If 1.0 g and 2.0 g are used the setting times are 30 and 3 minutes respectively (Examples 11 and 12).

EXAMPLES 13 TO 30

Experiments were carried out as in Examples 1 to 12 but using setting agents other than calcium sulphate hemihydrate. Comparative tests not according to the invention are identified by letters.

The quantities used and the results obtain are shown in Table 2.

The metal cation compounds used had particle sizes in the range 50 to 100 British Standard mesh (150–300 microns). In the Table entries under the heading solubility of the form $1.0^{20}$ show the solubility in grams in 100 grams water at the temperature given in the superscript.

WATER LOSS TESTS

Tests were carried out to determine the water loss from ground coverings made in a similar way to Example 10. The tests were carried out at 20° C. The samples used were $100 \times 100 \times 15$ mm thick.

The results obtained were as follows

TABLE 3

| Weight Percentage of water lost | Time (hours) |
|---|---|
| 12 | 5 |
| 25 | 10 |
| 40 | 20 |
| 55 | 40 |
| 65 | 60 |
| 75 | 80 |
| 80 | 120 |
| 83 | 160 |
| 87 | 240 |
| 90 | 340 |

The results for samples made using 0.5 to 2.0% calcium sulphate hemihydrate are similar.

The 10% (approximately) of water remains in the material 2 weeks after setting is probably tightly bound and will not adversely affect the product.

The product reaches a useable, sufficiently hard stage after 16–24 hours. The water content of the composition before setting was 18.8% by weight.

TABLE 1

| | SETTING OF LATICES BY ADDITION OF CALCIUM SULPHATE HEMIHYDRATE | | | | | | | | |
|---|---|---|---|---|---|---|---|---|---|
| | Calcium Sulphate Hemihydrate (ex Thornton and Ross, Liverpool) | | | Polychloroprene Latex (Butachlor L632 ex Distugil France) | Bitumen Emulsion (1915 ex BP Aquaseal kent | Sand 200 Mesh (ex BIS Redhill) | Tyre Crumb 40 Mesh (ex United Reclaim, Liverpool) | Zinc Oxide Dispersion (50% ex Rubber Latex Wythenshawe) | Time to Set |
| Example | A* | B* | C* | (g) | (g) | (g) | (g) | (g) | (mins.) |
| A | — | | | 100 | — | 50 | — | — | NO SETTING |
| 1 | 0.5 | 0.3 | .83 | 100 | — | 50 | — | — | 130 |
| 2 | 1.0 | 0.6 | 1.64 | 100 | — | 50 | — | — | 19 |
| 3 | 2.0 | 1.3 | 3.2 | 100 | — | 50 | — | — | 5 |
| 4 | 5.0 | 3.2 | 7.7 | 100 | — | 50 | — | — | 0.5 |
| B | — | | | 100 | — | — | 50 | — | NO SETTING |
| 5 | 0.5 | 0.3 | 8.3 | 100 | — | — | 50 | — | 110 |
| 6 | 1.0 | 0.6 | 1.6 | 100 | — | — | 50 | — | 12 |
| 7 | 2.0 | 1.3 | 3.2 | 100 | — | — | 50 | — | 2 |
| C | 5.0 | | | 100 | — | — | 50 | — | 0.2 |
| 8 | 0.5 | 0.3 | .83 | 100 | — | 25 | 25 | — | 115 |
| 9 | 1.0 | 0.6 | 1.6 | 100 | — | 25 | 25 | — | 14 |
| 10 | 0.5 | 0.5 | 2.7 | 30 | 15 | 32 | 20 | 2 | 180 |
| 11 | 1.0 | 1.0 | 5.3 | 30 | 15 | 32 | 20 | 2 | 30 |
| 12 | 2.0 | 1.98 | 10.0 | 30 | 15 | 32 | 20 | 2 | 3 |

The polychloroprene latex and the bitumen emulsion both had a solid content of 60% wt/wt.
A* = weight (g)
B* = wt % on total composition
C* = wt % on polychloroprene solids.

TABLE 2

| Experiment Number | METAL CATION COMPOUND | | | OTHER INGREDIENTS | | | | | | |
|---|---|---|---|---|---|---|---|---|---|---|
| | | Solubility | Diss Time | Amt | PCP | BIT | AQ | ZnO | SAND | TC | TIME TO SET |
| D | Ferric Acetate | Insol. | — | 1g | 100 | — | — | — | — | — | No Setting |
| E | Ferric Acetate | " | — | 2g | 100 | — | — | — | — | — | No Setting |

TABLE 2-continued

| Experiment Number | METAL CATION COMPOUND | | | | OTHER INGREDIENTS | | | | | | TIME TO SET |
|---|---|---|---|---|---|---|---|---|---|---|---|
| | | Solubility | Diss Time | Amt | PCP | BIT | AQ | ZnO | SAND | TC | |
| 13 | Cupric Sulphate | $32^0$ | 8 mins | 1 | 100 | — | — | — | — | — | 120 mins. |
| F | Calcium Nitrate | $341^{25}$ | 0.5 | 1 | 100 | — | — | — | — | — | Immediate Setting. |
| 14 | Cupric Sulphate | $32^0$ | 8 mins | 1 | 100 | — | — | — | 50 | — | 90 mins. |
| 15 | Aluminium Acetate | V.sl.s. | — | 1 | 100 | — | — | — | — | 50 | 60 mins. |
| 16 | Cupric Acetate | $7.2^{10}$ | 15 mins | 1 | 100 | — | — | — | — | 50 | 10 mins. |
| 17 | Magnesium Acetate | $40^{25}$ | 3 | 1 | 100 | — | — | — | — | 50 | 5 mins. |
| 18 | Lead Acetate | $50^{15}$ | 4 | 1 | 100 | — | — | — | — | 50 | 2 mins. |
| 19 | Lead Chloride | $1.0^{20}$ | 36 hrs | 4 | 59.2 | 30.3 | 0.2 | 3.3 | 64 | 41 | 13 mins |
| 20 | Lead Chloride | $1.0^{20}$ | 36 hrs | 3 | 59.2 | 30.3 | 0.2 | 3.3 | 64 | 41 | 20 mins |
| 21 | Lead Chloride | $1.0^{20}$ | 36 hrs | 2 | 59.2 | 30.3 | 0.2 | 3.3 | 64 | 41 | 6 hrs. |
| 22 | Barium Hydroxide | $5.6^{15}$ | 48 hrs | 1.5 | 59.2 | 30.3 | 0.2 | 3.3 | 64 | 41 | 10 mins. |
| 23 | Barium Hydroxide | $5.6^{15}$ | 48 hrs | 1.0 | 59.2 | 30.3 | 0.2 | 3.3 | 64 | 41 | 20 mins. |
| 24 | Barium Hydroxide | $5.6^{15}$ | 48 hrs | 0.75 | 59.2 | 30.3 | 0.2 | 3.3 | 64 | 41 | 16 hrs. |
| 25 | Calcium Formate | $17.0^{20}$ | 24 hrs | 1.0 | 59.2 | 30.3 | 0.2 | 3.3 | 64 | 41 | 0.5 mins. |
| 26 | Calcium Formate | $17.0^{20}$ | 24 hrs | 0.75 | 59.2 | 30.3 | 0.2 | 3.3 | 64 | 41 | 2.0 mins |
| 27 | Calcium Formate | $17.0^{20}$ | 24 hrs | 0.5 | 59.2 | 30.3 | 0.2 | 3.3 | 64 | 41 | 15 mins |
| 28 | Magnesium Acetate | $40^{25}$ | 3 | 1.0 | 59.2 | 30.3 | 0.2 | 3.3 | 64 | 41 | 0.5 mins. |
| 29 | Magnesium Acetate | $40^{25}$ | 3 | 0.5 | 59.2 | 30.3 | 0.2 | 3.3 | 64 | 41 | 1.0 mins. |
| 30 | Magnesium Acetate | $40^{25}$ | 3 | 0.25 | 59.2 | 30.3 | 0.2 | 3.3 | 64 | 41 | 15 mins |
| G | Calcium Chloride | $60^0$ | 1.0 | 0.5 | 59.2 | 30.3 | 0.2 | 3.3 | 64 | 41 | Immediate Setting |
| H | Calcium Chloride | $60^0$ | 1.0 | 0.25 | 59.2 | 30.3 | 0.2 | 3.3 | 64 | 41 | No Setting |
| I | Calcium Nitrate | $341^{25}$ | 0.5 | 1.0 | 59.2 | 30.3 | 0.2 | 3.3 | 64 | 41 | Immediate Setting |
| J | Calcium Nitrate | $341^{25}$ | 0.5 | 0.5 | 59.2 | 30.3 | 0.2 | 3.3 | 64 | 41 | No Setting |

Diss Time = Dissolution Time
V.sl.s = very slightly soluble.
PCP = Polychloroprene latex (60% solids content)
BIT = Bitumen emulsion (60% solids content)
AQ = Aquarex foam stabilizer compound composed of
Aquarex NS (DuPont) 80 parts by wt
Aquarex ME (DuPont) 40 parts by wt
Daxad 15 (WR Grace) 10 parts by wt
(napthalene sulphonic acid) formaldehyde condensation product.
Water 567 parts by wt.
TC = Tyre Crumb.

I claim:

1. A process for the delayed action setting of a composition comprising adding to anionic latex of polychloroprene a delayed action setting agent compound containing a multivalent metal cation, which metal cation compound has a solubility in the range 0.1 g to 150 g per 100 g of water at 20° C. in water and which has a dissolution time greater than 1 minute, the quantity of metal cation compound being not more than 2.5% by weight based on the total weight of composition and not more than 11% based on the weight of polychloroprene solids in the composition.

2. A process according to claim 1 wherein the solubility of the metal cation compound in water is in the range 0.1 g to 50 g per 100 g of water at 20° C.

3. A process according to either one of claims 1 or 2 wherein the dissolution time is over 2 minutes.

4. A process according to claim 3 wherein the dissolution time is over 5 minutes.

5. A process according to claims 1 or 2 wherein the metal cation compound has a particle size in the range 25 to 1000 microns.

6. A process according to claim 5 wherein the particle size is in the range 75 to 800 microns.

7. A process according to claims 1 or 2 wherein the metal cation compound is calcium sulphate hemihydrate.

8. A process according to claims 1 or 2 wherein the quantity of metal cation compound added to the composition is in the range 0.5 to 2% by weight based on the total weight of composition.

9. A process according to claims 1 or 2 wherein the quantity of metal cation compound is not more than 6% by weight based on the weight of polychloroprene solids in the composition.

10. A process according to claim 1 or 2 wherein the composition contains in addition to the polychloroprene, a latex of an additional film forming material.

11. A process according to claim 10 wherein the film forming material is bitumen.

12. A process according to claims 10 wherein the weight ratio of additional film forming material to polychloroprene is in the range 2:1 to 1:2.

13. A process according to claims 1 or 2 wherein the composition additionally contains a quantity of inert non-hydraulic filler is in the range 25% to 60% by weight based on the total weight of composition.

14. A process according to claims 1 or 2 wherein the composition contains a hard filler and a deformable filler in the weight ratio of 3:2 to 2:3.

* * * * *